US008639271B2

(12) United States Patent
Duggal et al.

(10) Patent No.: US 8,639,271 B2
(45) Date of Patent: Jan. 28, 2014

(54) METHOD AND APPARATUS FOR SUPPORTING LOCATION-BASED SERVICES BY A REMOVABLE MODULE

(75) Inventors: Nakul Duggal, San Diego, CA (US); Kirk Allan Burroughs, San Diego, CA (US); Carl Qu, San Diego, CA (US); Bryan C. Gurganus, San Diego, CA (US); Bryan R. Cook, Piedmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 12/495,969

(22) Filed: Jul. 1, 2009

(65) Prior Publication Data

US 2010/0004003 A1    Jan. 7, 2010

Related U.S. Application Data (60) Provisional application No. 61/077,591, filed on Jul. 2, 2008.

(51) Int. Cl.
*H04W 24/00* (2009.01)
*H04M 11/04* (2006.01)

(52) U.S. Cl.
USPC .............. 455/456.6; 455/404.1; 455/456.1; 455/456.3; 455/456.2

(58) Field of Classification Search
USPC ............ 455/466, 456.3, 456.1, 450, 456.2, 455/456.5, 66.1, 404.1–404.4; 340/539.13, 340/572.1, 8.1; 710/100
See application file for complete search history.

(56) References Cited

U.S. PATENT DOCUMENTS 6,600,917 B1 * 7/2003 Maupin ...................... 455/414.1
6,816,895 B2 * 11/2004 Andreakis et al. ............ 709/219
7,478,146 B2 * 1/2009 Tervo et al. ................... 709/220

(Continued)

FOREIGN PATENT DOCUMENTS

CN         1585313 A       2/2005
JP         2002196063      7/2002

(Continued)

OTHER PUBLICATIONS

3GPP, CDMA Card Application Toolkit, Aug. 2007, 3GPP2, C.S0035-A ver. 2.0.*

(Continued)

*Primary Examiner* — Kent Chang
*Assistant Examiner* — William Lu
(74) *Attorney, Agent, or Firm* — Mary A. Fales (57) ABSTRACT

Techniques for supporting location-based services (LBS) by a removable module are described. A set of messages (e.g., commands and events) may be defined to support location-based services by the removable module. In one design, the removable module may send a first message (e.g., a Get Position—Request message) to a terminal to request for location information. The first message may be sent for an LBS application running on the removable module. The removable module may thereafter receive a second message (e.g., a Get Position—Response message) with the requested location information from the terminal. The removable module may execute a task for the LBS application based on the location information. The task may include reporting the location of the terminal, initiating a voice call, sending an SMS message, displaying a menu on the terminal, sending a report for tracking of the terminal, etc.

30 Claims, 4 Drawing Sheets

(56) References Cited

U.S. PATENT DOCUMENTS

| | | | |
|---|---|---|---|
| 7,515,914 B2* | 4/2009 | Herrod et al. | 455/456.1 |
| 7,617,342 B2* | 11/2009 | Rofougaran | 710/100 |
| 2003/0125049 A1* | 7/2003 | Buchmann et al. | 455/456 |
| 2004/0162089 A1 | 8/2004 | Fan et al. | |
| 2005/0180346 A1* | 8/2005 | Benes et al. | 370/310 |
| 2005/0227709 A1* | 10/2005 | Chang et al. | 455/456.1 |
| 2006/0116169 A1* | 6/2006 | Park | 455/558 |
| 2006/0181411 A1* | 8/2006 | Fast et al. | 340/539.13 |
| 2006/0223549 A1* | 10/2006 | Chang | 455/456.2 |
| 2007/0015538 A1* | 1/2007 | Wang | 455/558 |
| 2007/0037585 A1* | 2/2007 | Shim | 455/456.1 |
| 2007/0155400 A1* | 7/2007 | Madsen | 455/456.1 |
| 2007/0207798 A1* | 9/2007 | Talozi et al. | 455/423 |
| 2008/0132279 A1* | 6/2008 | Blumenthal | 455/558 |
| 2008/0182592 A1* | 7/2008 | Cha et al. | 455/456.3 |
| 2008/0261557 A1* | 10/2008 | Sim | 455/404.2 |
| 2009/0054091 A1* | 2/2009 | van Wijk et al. | 455/466 |
| 2009/0088181 A1* | 4/2009 | Savolainen | 455/456.1 |
| 2009/0117875 A1* | 5/2009 | Weigele et al. | 455/411 |
| 2010/0167754 A1* | 7/2010 | Jolivet | 455/456.1 |

FOREIGN PATENT DOCUMENTS

| | | |
|---|---|---|
| TW | 200729058 | 8/2007 |
| WO | WO2006106187 A1 | 10/2006 |
| WO | 2007012310 A1 | 2/2007 |

OTHER PUBLICATIONS

3GPP TS 31.111 V8.2.0, 3rd Generation Partnership Project; Technical Specification Group Core Network and Terminals; Universal Subscriber Identity Module (USIM), Application Toolkit (USAT) (Release 8), Jun. 2008, 90 pages.

International Search Report and Written Opinion—PCT/US2009/049567, International Search Authority—European Patent Office—Aug. 24, 2009.

Taiwan Search Report—TW098122458—TIPO—Sep. 7, 2012.

\* cited by examiner

METHOD AND APPARATUS FOR SUPPORTING LOCATION-BASED SERVICES BY A REMOVABLE MODULE

CLAIM OF PRIORITY UNDER 35 U.S.C. §119

The present Application for Patent claims priority to Provisional U.S. Application Ser. No. 61/077,591, entitled "OMH R-UIM CCAT gpsOne services for cdma2000," filed Jul. 2, 2008, assigned to the assignee hereof, and expressly incorporated herein by reference.

BACKGROUND

I. Field

The present disclosure relates generally to communication, and more specifically to techniques for supporting location-based services (LBS).

II. Background

It is often desirable, and sometimes necessary, to know the location of a terminal, e.g., a cellular phone. The terms "location" and "position" are synonymous and are often used interchangeably. For example, an LBS client may desire to know the location of the terminal for a location-based service and may communicate with a location center in order to request the location of the terminal. The location center and the terminal may then exchange messages to obtain a location estimate for the terminal. A location estimate may also be referred to as a position estimate, a position fix, etc. The location center may then return the location estimate to the LBS client. It may be desirable to efficiently support location-based services.

SUMMARY

Techniques for supporting location-based services by a removable module are described herein. The removable module may store subscription information, personal information, and/or other information for a user and may be inserted into a terminal, e.g., a cellular phone. The removable module may include LBS applications that may utilize location information to perform various actions. The location information may comprise a location estimate, speed, orientation, etc., of the terminal.

In an aspect, a set of messages (e.g., commands and events) may be defined to support location-based services by the removable module. In one design, a Get Position—Request message may be used by the removable module to request for location information from the terminal, and a Get Position—Response message may be used by the terminal to return the requested location information to the removable module. In one design, a Positioning Capability Update message may be used by the terminal to provide its positioning capabilities to the removable module, and a Positioning Availability Update message may be used by the terminal to provide the currently available positioning capabilities to the removable module.

In one design, the removable module may send a first message (e.g., a Get Position—Request message) to the terminal to request for location information. The first message may be sent for an LBS application running on the removable module. The removable module may thereafter receive a second message (e.g., a Get Position—Response message) with the requested location information from the terminal. The removable module may execute a task for the LBS application based on the location information. The task may include reporting the location of the terminal, initiating a voice call, sending a Short Message Service (SMS) message, displaying a menu on the terminal, sending a report for tracking of the terminal, etc.

Various aspects and features of the disclosure are described in further detail below.

DETAILED DESCRIPTION

The word "exemplary" is used herein to mean "serving as an example, instance, or illustration." Any design described herein as "exemplary" is not necessarily to be construed as preferred or advantageous over other designs.

Figure 1:
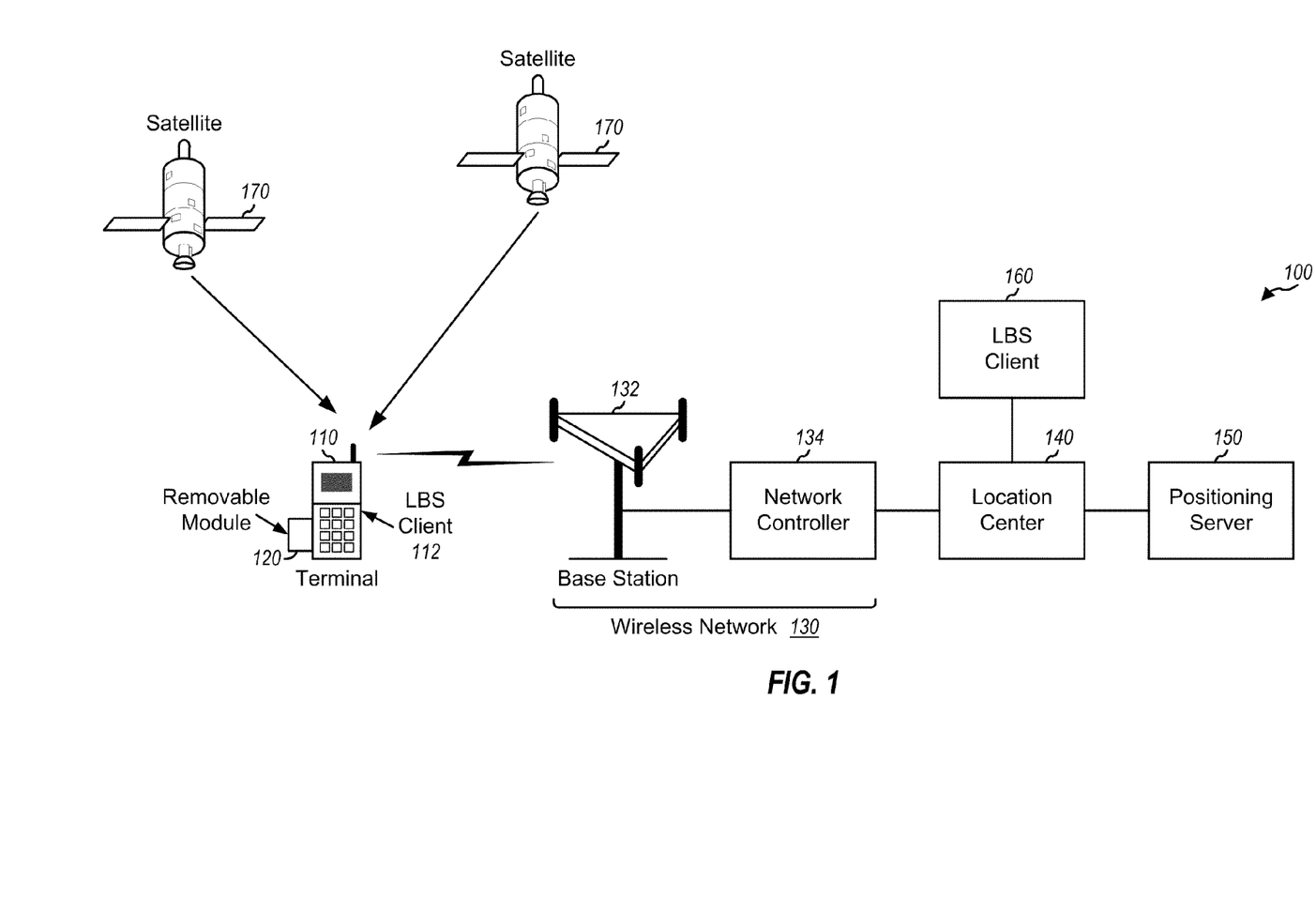
FIG. 1 shows an exemplary network deployment.

FIG. 1 shows an exemplary network deployment 100. A wireless network 130 may include a number of base stations and other network entities that can support various services for terminals. For simplicity, only one base station 132 and only one network controller 134 are shown for wireless network 130 in FIG. 1. Base station 132 may support radio communication for terminals. Network controller 134 may provide coordination and control for a set of base stations and may be a single network entity or a collection of network entities. Wireless network 130 may be a Code Division Multiple Access (CDMA) 1X network, a High Rate Packet Data (HRPD) network, an Ultra Mobile Broadband (UMB) network, a Wideband CDMA (WCDMA) network, a Global System for Mobile Communications (GSM) network, a Long Term Evolution (LTE) network, a wireless local area network (WLAN), etc. GSM, WCDMA and LTE are described in documents from an organization named "3rd Generation Partnership Project" (3GPP). CDMA 1X, HRPD and UMB are described in documents from an organization named "3rd Generation Partnership Project 2" (3GPP2).

A location center 140 may communicate with wireless network 130 and a positioning server 150. Location center 140 may perform various functions to support location-based services, interface with LBS clients such as LBS clients 112 and 160, and perform functions such as subscriber privacy, authorization, authentication, billing, etc. Location-based services may also be referred to as location services (LCS) and may include any services that utilize location information. Location information may comprise any information related to the location of a target device, e.g., a location estimate. Location center 140 may also be referred to as a location server, a Mobile Positioning Center (MPC), a Gateway Mobile Location Center (GMLC), Secure User Plane Location (SUPL) Location Center (SLC), etc. Positioning server 150 may support positioning for terminals and delivery of assistance data to the terminals. Positioning refers to a functionality that determines a geographical location of a target device. Positioning server 150 may also be referred to as a Position Determination Entity (PDE), a Serving Mobile Location Center (SMLC), a SUPL Positioning Center (SPC), etc. LBS clients 112 and 160 may each be a function or an entity that requests location information for a target device. An LBS client may reside in a terminal or some other entity.

Satellites 170 may be part of a Global Navigation Satellite System (GNSS), which may be the United States Global Positioning System (GPS), the European Galileo system, the Russian GLONASS system, etc. A GNSS may also be referred to as a Satellite Positioning System (SPS) and may include a system of satellites positioned to enable entities to determine their location on or above the Earth based on signals received from the satellites.

A terminal 110 may communicate with base station 132 in wireless network 130 to obtain communication services. Terminal 110 may be stationary or mobile and may also be referred to as a mobile station (MS), a user equipment (UE), a mobile equipment (ME), an access terminal, a SUPL enabled terminal (SET), a subscriber unit, a station, a device, a handset, etc. Terminal 110 may be a cellular phone, a personal digital assistant (PDA), a wireless device, a smart phone, a wireless modem, a wireless router, a laptop computer, a telemetry device, a tracking device, etc.

Terminal 110 may support one or more positioning methods such as GPS, Galileo, GLONASS, Advanced Forward Link Trilateration (AFLT), Enhanced Observed Time Difference (E-OTD), Observed Time Difference Of Arrival (OTDOA), assisted GPS (AGPS) hybrid, etc. GPS, Galileo, and GLONASS are positioning methods that can determine a location estimate based on measurements for satellites. AFLT, E-OTD and OTDOA are positioning methods that can determine a location estimate based on measurements for base stations. AGPS hybrid is a positioning method that can determine a location estimate based on measurements for a combination of satellites and base stations. For simplicity, in the description herein, the term "GPS" generically refers to a positioning method for any GNSS, and the term "AFLT" generically refers to a positioning method for any wireless network.

As shown in FIG. 1, terminal 110 may be mated with a removable module 120, which may store subscription information, personal information, and/or other information for a user. For example, removable module 120 may store account numbers, phone numbers, pictures, text messages, etc. In general, a removable module may be a removable identification (ID) chip, a Universal Integrated Circuit Card (UICC), a smartcard, or some other module that may be inserted into and removed from a device such as a cellular phone, a smart phone, a PDA, etc. Removable module 120 may be a User Identity Module (UIM), a Removable UIM (R-UIM), a CDMA Subscriber Identity Module (CSIM), a Subscriber Identity Module (SIM), a Universal Subscriber Identity Module (USIM), etc. R-UIM and CSIM may be used in CDMA networks, SIM and USIM may be used in GSM and WCDMA networks, and UIM may be used in CDMA, GSM and WCDMA networks.

Removable module 120 may provide certain advantages. First, by storing pertinent information on removable module 120, the user can easily change phone and still keep the pertinent information by simply inserting the removable module into a new phone. This may simplify phone upgrades, phone replacements, or using the same phone on a different network. Second, storing pertinent information on removable module 120 may simplify the design of terminals and may ensure consistent behavior between terminals and networks.

Figure 2:
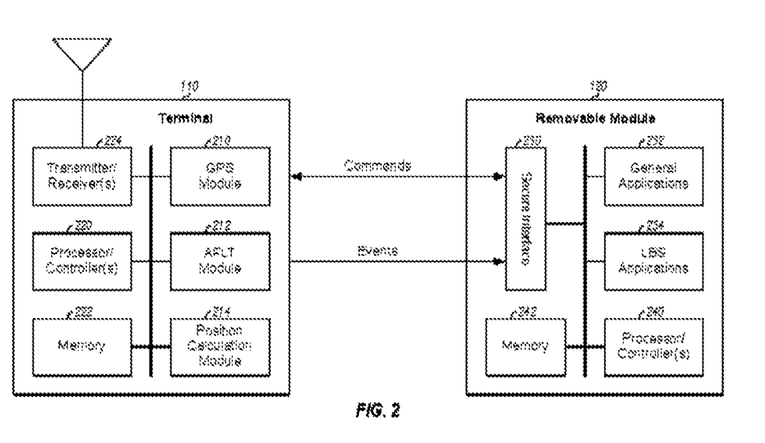
FIG. 2 shows a block diagram of a terminal and a removable module.

FIG. 2 shows a block diagram of an exemplary design of terminal 110 and removable module 120. Terminal 110 may include various modules to support positioning such as a GPS module 210, an AFLT module 212, and a position calculation module 214. GPS module 210 may measure signals from satellites and may provide pseudo-range measurements for the satellites. AFLT module 212 may measure signals from base stations in a wireless network and may provide timing measurements, signal strength measurements, and/or signal quality measurements for the base stations. Position calculation module 214 may receive the pseudo-range measurements from GPS module 210, the timing, signal strength, and/or signal quality measurements from AFLT module 212, and/or other measurements. Position calculation module 214 may determine a location estimate for terminal 110 based on the measurements and other information, e.g., the location of the satellites and/or base stations. Terminal 110 may support gpsOne™, which is a position location technology from Qualcomm Incorporated that supports GPS, AFLT, and hybrid positioning methods. Terminal 110 may also support other position location technologies.

Terminal 110 may include one or more processors/controllers 220, memory 222, and one or more transmitters/receivers 224. Transmitter/receiver(s) 224 may provide radio communication for terminal 110 and may support any of the radio technologies mentioned above. Processor/controller(s) 220 may control the operation of various modules within terminal 110 and may perform processing for active applications. Memory 242 may store data and program codes for terminal 110.

Removable module 120 may include a secure interface 230, general applications 232, and LBS applications 234. Secure interface 230 may support secure communication with terminal 110 (e.g., via a standard protocol) and may perform secure processing to allow only authorized entities to access removable module 120. General applications 232 may support various services such as voice, packet data, SMS, browser, etc. LBS applications 234 may support various location-based services that use location information. Removable module 120 may also include one or more processors/controllers 240 and memory 242. Processor/controller(s) 240 may control the operation of various modules within removable module 120 and may perform processing for all active applications. Memory 242 may store data and program codes for removable module 120.

Terminal 110 may be an Open Market Handset (OMH). An OMH is a generic terminal or device that can be sold on the "open market" and used in one or more wireless networks. The OMH program is part of an overall Global Handset Requirements for CDMA (GHRC) initiative from CDMA Development Group (CDG). The GHRC initiative specifies a common set of requirements and standards for approving CDMA devices in an open-device or open-application environment. One example of accomplishing this initiative is to move operator-specific configuration information and subscriber-specific provisioning information from devices to R-UIMs and ensuring consistent behavior between OMH-compliant devices and networks.

Terminal 110 and removable module 120 may support CDMA Card Application Toolkit (CCAT) defined by 3GPP2. CCAT is a standardized set of commands and procedures that enables applications stored on an R-UIM to interact with and operate on any device that is capable of accepting R-UIMs and supporting CCAT. CCAT enables applications on an R-UIM to function on a device from any manufacturer that supports CCAT. CCAT is described in 3GPP2 C.S0035-A, entitled "CDMA Card Application Toolkit (CCAT)," August 2007, which is publicly available.

As shown in FIG. 2, removable module 120 may communicate with terminal 110 via CCAT proactive commands and CCAT events. Removable module 120 may send CCAT proactive commands to terminal 110 to request services such as make a voice call, send an SMS message, launch a browser, display menus and texts on terminal 110, etc. Terminal 110 may send CCAT events to inform removable module 120 of certain events that removable module 120 has subscribed to, e.g., call connected, user key press, etc.

In an aspect, CCAT may be enhanced to allow removable module 120 to support location-based services. The enhancement may include a set of CCAT commands and CCAT events that may allow removable module 120 to request for and receive location information from terminal 110. Commands and events may be considered as different types of messages. LBS applications 234 within removable module 120 can then provide location-based services to the user based on the location information from terminal 110, e.g., to find places of interest near the current location.

The CCAT enhancement may be for a particular position location technology such as, e.g., gpsOne™. This may be achieved by adding features and parameters from the position location technology into CCAT by exposing options of appropriate level that can be easily handled by removable module 120 and terminal 110. New CCAT commands and new CCAT events may be defined to support the position location technology.

In one design, a CCAT command of Get Position—Request may be defined to allow removable module 120 to request for location information from terminal 110. Table 1 gives a set of parameters for the Get Position—Request, in accordance with an exemplary design. In the tables below, an "M" in a Presence column indicates a mandatory parameter, and a "C" indicates a parameter that is conditional on value.

TABLE 1

Get Position - Request

| Parameter | Presence | Description | Size |
|---|---|---|---|
| Mode | M | Indicate a selected positioning mode:<br>0 - Device default<br>1 - Standalone, with possible use of XTRA<br>2 - MS-based<br>3 - MS-assisted<br>4 - AFLT<br>5 - MS-based preferred<br>6 - MS-assisted preferred | 16 bits |
| Accuracy | M | Number in meters (0 means device default) | 16 bits |
| Time to Fix | M | Number in seconds (0 means don't care) | 8 bits |
| Request Flags | M | Indicate what optional information is being requested:<br>Altitude: True/False<br>Horizontal speed: True/False<br>Vertical speed: True/False<br>Orientation: True/False | 16 bits |

As shown in Table 1, the Mode parameter may be used to select one of a number of possible positioning modes. The device default mode may be a default positioning mode for terminal 110. In the standalone mode, terminal 110 may determine a location estimate by itself. In the MS-based positioning mode, the location of terminal 110 is determined by the terminal, possibly with assistance data from positioning server 150. In the MS-assisted positioning mode, the location of terminal 110 is determined by positioning server 150 with assistance (e.g., measurements) from terminal 110. Extended Receiver Assistance (XTRA) for GPS may be used by terminal 110 to download information indicative of the position of one or more satellites from a server, e.g., location center 140. The downloaded information may improve the time to first fix (TTFF) of the terminal location.

The Accuracy parameter may indicate the desired accuracy of a location estimate. The Time of Fix parameter may indicate the desired time to obtain the location estimate. The Request Flags may be set to request for additional information such as altitude, horizontal speed, vertical speed, orientation, etc.

In one design, a CCAT command of Get Position—Response may be defined to allow terminal 110 to return the requested location information to removable module 120. Table 2 gives a set of parameters for the Get Position—Response, in accordance with an exemplary design.

TABLE 2

Get Position - Response

| Parameter | Presence | Description | Size |
|---|---|---|---|
| Timestamp | M | UTC time - include the following:<br>Year: 14 bits<br>Month: 4 bits<br>Day: 5 bits<br>Hour: 5 bits<br>Minute: 6 bits<br>Second: 6 bits | 40 bits |
| Latitude | M | Provide latitude of device | 25 bits |
| Longitude | M | Provide longitude of device | 26 bits |
| Uncertainty | M | Indicate uncertainty in the location estimate | 14 bits |
| Response Flags | M | Indicate what additional information is available: | 16 bits |
|  | C | Altitude | 14 bits |
|  | C | Horizontal speed | 9 bits |
|  | C | Vertical speed | 8 bits |
|  | C | Orientation | 10 bits |

The parameters in Table 2 may be given in various formats, e.g., the formats used for gpsOne. gpsOne defines 14 bits as reference CDMA time. For the Timestamp parameter, terminal 110 may provide time of date after conversions for universal coordinated time (UTC).

In one design, a CCAT event of Positioning Capability Update may be defined to allow terminal 110 to provide its positioning capabilities (i.e., what terminal 110 can support) to removable module 120. Table 3 gives a set of parameters for the Positioning Capability Update, in accordance with an exemplary design.

TABLE 3

Positioning Capability Update

| Parameter | Presence | Description | Size |
|---|---|---|---|
| Mode | M | Provide supported positioning modes:<br>0 - Device default<br>1 - Standalone, with possible use of XTRA<br>2 - MS-based<br>3 - MS-assisted<br>4 - AFLT<br>5 - MS-based preferred<br>6 - MS-assisted preferred | 16 bits |

In one design, a CCAT event of Positioning Availability Update may be defined to allow terminal 110 to indicate what it can currently provide to removable module 120. Table 4 gives a set of parameters for the Positioning Availability Update in accordance with an exemplary design.

TABLE 4

Positioning Availability Update

| Parameter | Presence | Description | Size |
|---|---|---|---|
| Mode | M | Provide available positioning modes:<br>0 - Device default<br>1 - Standalone, with possible use of XTRA<br>2 - MS-based<br>3 - MS-assisted<br>4 - AFLT<br>5 - MS-based preferred<br>6 - MS-assisted preferred | 16 bits |

Tables 1 to 4 show exemplary designs of some CCAT commands and CCAT events that may be used to support location-based services by removable module 120. Other CCAT commands and/or CCAT events may also be defined to support location-based services. The CCAT commands and CCAT events may include the parameters given in Tables 1 to 4. The CCAT commands and CCAT events may also include different and/or additional parameters not shown in Tables 1 to 4. For example, the Get Position—Request command may include parameters to support periodic reporting or event triggered reporting by terminal 110 or removable module 120. For periodic reporting, terminal 110 or removable module 120 may periodically report its location based on a start time, a time interval between reporting events, an end time, etc. For event triggered reporting, terminal 110 or removable module 120 may report its location whenever certain trigger conditions are met. The trigger conditions may cover terminal 110 entering or leaving a particular area, terminal 110 having traveled a specified distance since the last location reporting, etc. The Get Position—Response may include parameters for error events, e.g., in case terminal 110 is not able to provide the requested location information.

Figure 3:
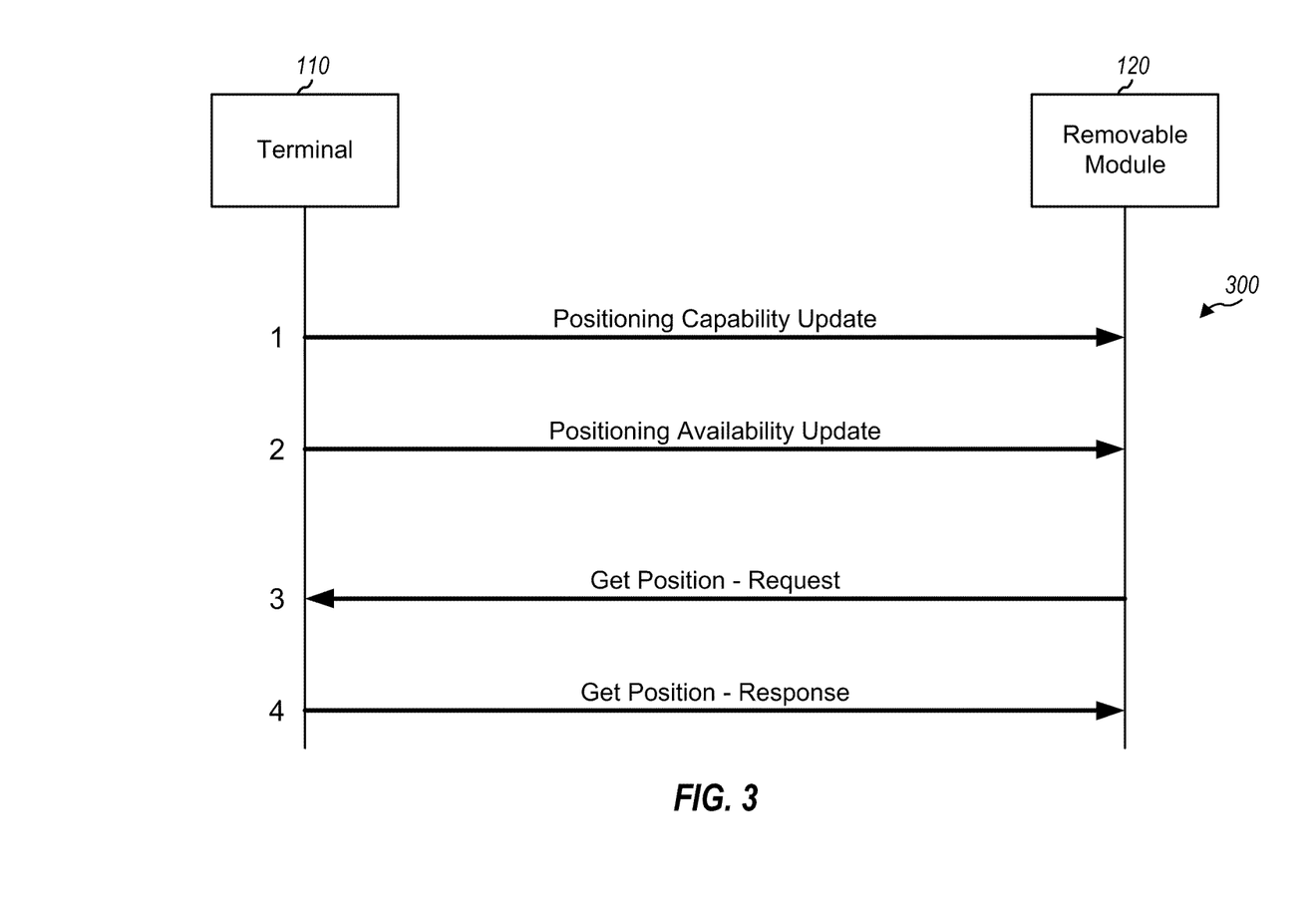
FIG. 3 shows a call flow for supporting LBS by the removable module.

FIG. 3 shows an exemplary design of a call flow 300 for supporting location-based services by removable module 120. Terminal 110 may send a Positioning Capability Update event to removable module 120, e.g., when removable module 120 is inserted into terminal 110, when removable module 120 requests for the information, etc. (step 1). Removable module 120 may learn of the positioning capabilities of terminal 110 based on the Positioning Capability Update. This information may be used to determine which LBS applications within removable module 120 can be supported. For example, terminal 110 may support only AFLT, in which case LBS applications requiring accurate location may not be supported.

Terminal 110 may send a Positioning Availability Update event to removable module 120, e.g., when removable module 120 requests for the information, when terminal 110 detects a change in available positioning methods, etc. (step 2). For example, terminal 110 may support GPS positioning but may be located indoor where GPS signals are undetectable. Terminal 110 may then send the Positioning Availability Update to indicate that GPS positioning is unavailable.

Removable module 120 may launch an LBS application, e.g., in response to a user request. The LBS application may require the location of terminal 110 in order to provide certain information or perform certain tasks. Removable module 120 may then send a Get Position—Request command to terminal 110 to ask for the location of the terminal (step 3). The Get Position—Request may include parameters (e.g., accuracy, time to first fix, etc.) that may be set based on the requirements of the LBS application.

Terminal 110 may receive the Get Position—Request and may determine its location in response to the request. Terminal 110 may then return a Get Position—Response to removable module 120 (step 4). Steps 3 and 4 may be repeated any number of times, as needed by the LBS application.

The techniques described herein may be used to support various LBS applications on removable module 120. The LBS applications may provide various location-based services. For example, an LBS application may determine when the location of terminal 110 is close to a specific area, when a geographic boundary is crossed, etc. When a trigger condition is satisfied, the LBS application may perform any one of the following:

Make a voice call,

Send an SMS message, e.g., to a server to automatically receive an e-coupon over SMS, to a server to report the current location periodically or based on a change in location, etc., Display a text or menu using CCAT commands to provide information to the user or for further actions to be taken by the user, e.g., to prompt the user that he is close to a shopping mall and can request e-coupons, to prompt the user that he can buy snacks from a nearby vending machine, etc., Track the location of terminal 110, e.g., by sending a tracking report with location information via SMS shortly after power-up and/or periodically afterwards, and Other actions.

Figure 4:
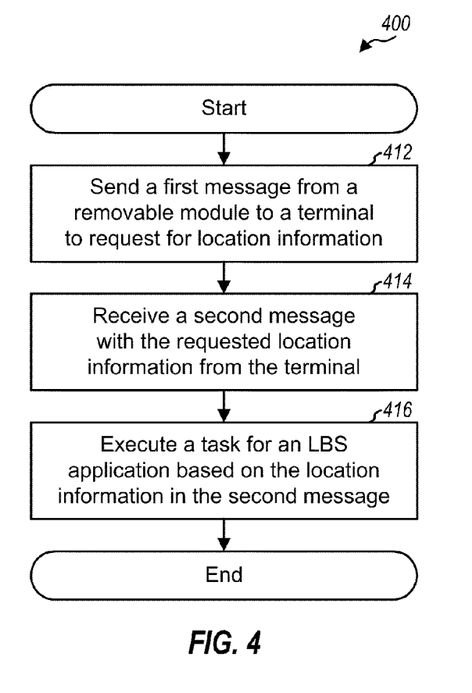
FIG. 4 shows a process for supporting LBS by the removable module.

FIG. 4 shows an exemplary design of a process 400 for supporting location-based services by a removable module, e.g., removable module 120. The removable module may comprise a UIM, an R-UIM, a CSIM, a SIM, a USIM, etc.

The removable module may send a first message (e.g., a Get Position—Request message) to a terminal to request for location information (block 412). The first message may be sent for an LBS application running on the removable module. The removable module may receive a second message (e.g., a Get Position—Response message) with the requested location information from the terminal (block 414). The first and second messages may comprise CCAT commands or some other commands for some other protocol.

The location information may comprise a location estimate for the terminal. The first message may include a positioning mode to use to obtain the location estimate, a target accuracy for the location estimate, a target time to fix for the location estimate, etc. The location estimate may then be determined by the terminal in accordance with the selected positioning mode, the target accuracy, and/or the target time to fix. The location information may also comprise altitude, horizontal speed, vertical speed, and/or orientation of the terminal. The location information may also include other information.

Prior to block 412, the removable module may receive a message (e.g., a Positioning Capability Update message) with positioning capabilities of the terminal and may select a positioning mode based on the positioning capabilities of the terminal. The removable module may also receive a message (e.g., a Positioning Availability Update message) with available positioning modes for the terminal and may select one of the available positioning modes. In either case, the removable module may generate the first message to include the selected positioning mode.

The removable module may execute a task for the LBS application based on the location information in the second message (block 416). The task may include reporting the location of the terminal, initiating a voice call, sending an SMS message, displaying a menu on the terminal, sending a report for tracking of the terminal, etc.

Figure 5:
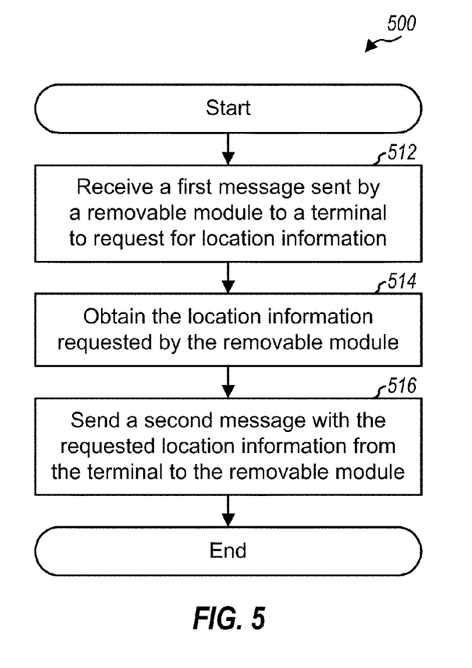
FIG. 5 shows a process for supporting LBS by the terminal.

FIG. 5 shows an exemplary design of a process 500 for supporting location-based services by a terminal, e.g., terminal 110. The terminal may receive a first message sent by a removable module to request for location information (block 512). The terminal may obtain the location information requested by the removable module (block 514). In one design, the terminal may determine a location estimate for itself, e.g., in accordance with a selected positioning mode, a target accuracy, and/or a target time to fix received from the first message. The terminal may also determine its altitude, horizontal speed, vertical speed, orientation, etc. The location information may comprise the location estimate and/or other information. The terminal may send a second message with the requested location information to the removable module (block 516).

Prior to block 512, the terminal may send a message with its positioning capabilities. The terminal may then obtain from the first message a positioning mode selected by the removable module based on the positioning capabilities of the terminal. The terminal may also send a message with available positioning modes for the terminal. The terminal may then obtain from the first message a positioning mode selected by the removable module from among the available positioning modes. In either case, the terminal may obtain the location information in accordance with the selected positioning mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method implemented in a removable module for supporting location-based services (LBS), comprising:
   receiving a first message from a terminal, the first message including an indication of positioning capabilities of the terminal, the removable module being removably received by and connected to the terminal, wherein the positioning capabilities are indicative of one or more supported positioning modes of the terminal;
   receiving a second message from the terminal, the second message including an indication of available ones of the supported positioning modes of the terminal;

selecting a positioning mode based on the available ones of the supported positioning modes of the terminal;

sending, after receiving the second message, a third message to the terminal, the third message including a request for location information and an indication of the selected positioning mode; and receiving a fourth message with the requested location information from the terminal by the removable module, the fourth message being sent by the terminal in response to the third message from the removable module.

2. The method of claim 1, wherein the location information comprises a location estimate for the terminal.

3. The method of claim 2, wherein the third message includes an indication of a positioning mode to use to obtain the location estimate, a target accuracy for the location estimate, a target time to fix, or a combination thereof for the location estimate.

4. The method of claim 1, wherein the location information comprises longitude, latitude, uncertainty, altitude, horizontal speed, vertical speed, orientation, or a combination thereof of the terminal.

5. The method of claim 1, wherein the third message is sent for an LBS application running on the removable module, the method further comprising:
executing a task for the LBS application based on the location information.

6. The method of claim 5, wherein the executing a task comprises initiating a voice call, sending a Short Message Service (SMS) message, displaying a menu on the terminal, sending a report for tracking of the terminal, or a combination thereof.

7. The method of claim 5, wherein the executing a task comprises:
determining whether a trigger has occurred based on the location information, and
reporting location of the terminal if the trigger has occurred.

8. The method of claim 1, wherein the first, second, third and fourth messages comprise CDMA Card Application Toolkit (CCAT) proactive commands.

9. The method of claim 1, wherein the removable module comprises a User Identity Module (UIM), a Removable UIM (R-UIM), a CDMA Subscriber Identity Module (CSIM), a Subscriber Identity Module (SIM), or a Universal Subscriber Identity Module (USIM).

10. A removable module comprising:
means for removably connecting to and communicating with a terminal;
means for receiving a first message from the terminal with an indication of positioning capabilities of the terminal, wherein the positioning capabilities are indicative of one or more supported positioning modes of the terminal;
means for receiving a second message from the terminal, wherein the second message includes an indication of available ones of the supported positioning modes of the terminal;
means for selecting a positioning mode based on the available ones of the supported positioning modes of the terminal;
means for sending, after receiving the second message, a third message to the terminal, the third message including a request for location information and an indication of the selected positioning mode; and
means for receiving a fourth message from the terminal with the requested location information, the fourth message being sent by the terminal in response to the third message from the removable module.

11. The removable module of claim 10, wherein the third message is sent for a location-based services (LBS) application running on the removable module, the apparatus further comprising:
means for executing a task for the LBS application based on the location information.

12. An apparatus for wireless communication, comprising:
at least one processor residing within a removable module, wherein the removable module is configured to mate with the terminal and the at least one processor is configured to:
receive a first message from a terminal with an indication of positioning capabilities of the terminal, wherein the positioning capabilities are indicative of one or more supported positioning modes of the terminal;
receive a second message from the terminal, wherein the second message includes an indication of available ones of the supported positioning modes of the terminal;
select a positioning mode based on the available ones of the supported positioning modes of the terminal;
send, after receiving the second message, a third message from the removable module to the terminal, the third message including a request for location information and an indication of the selected positioning mode; and
receive a fourth message with the requested location information from the terminal by the removable module, the fourth message being sent by the terminal in response to the third message from the removable module.

13. The apparatus of claim 12, wherein the at least one processor is configured to send the third message for a location-based services (LBS) application running on the removable module, and to execute a task for the LBS application based on the location information.

14. A computer program product in a removable module configured to be removably received by a terminal, the computer program product comprising:
a non-transitory computer-readable medium having stored thereon computer-executable code, the code comprising:
code for causing at least one computer to select a positioning mode based on an indication of supported positioning modes indicated in a first message received from the terminal and available ones of the supported positioning modes indicated in a second message received from the terminal;
code for causing the at least one computer to send a third message to the terminal after receipt of the second message, the third message including a request for location information and an indication of the selected positioning mode, and
code for causing the at least one computer to receive a fourth message with the requested location information from the terminal, the fourth message being sent by the terminal in response to the third message.

15. A method implemented in a terminal for supporting location-based services, the method comprising:
sending a first message to a removable module removably received by the terminal, the first message including an indication of positioning capabilities of the terminal, wherein the positioning capabilities are indicative of one or more supported positioning modes of the terminal;

sending a second message to the removable module prior to receiving a request for location information, the second message including an indication of available ones of the supported positioning modes of the terminal;

receiving a third message sent by the removable module, the third message comprising the request for location information;

obtaining from the third message an indication of a positioning mode selected by the removable module based on the available ones of the supported positioning modes of the terminal;

obtaining the location information in accordance with the selected positioning mode; and sending a fourth message with the requested location information from the terminal to the removable module, the fourth message being sent by the terminal in response to the third message from the removable module.

16. The method of claim 15, further comprising:
determining a location estimate for the terminal in response to the third message, and wherein the location information comprises the location estimate.

17. The method of claim 16, further comprising:
obtaining a target accuracy, or a target time to fix, or both for the location estimate from the second message, and wherein the location estimate is determined in accordance with the target accuracy, or the target time to fix, or both.

18. The method of claim 15, wherein the first, second and third messages comprise CDMA Card Application Toolkit (CCAT) proactive commands.

19. A terminal comprising:
means for removably receiving a removable module;
means for sending a first message to the removable module, the first message including an indication of positioning capabilities of the terminal, wherein the positioning capabilities are indicative of one or more supported positioning modes of the terminal;
means for sending a second message to the removable module prior to receiving a request for location information, the second message including an indication of available ones of the supported positioning modes of the terminal;
means for receiving a third message sent by the removable module, the third message comprising the the terminal to request for location information;
means for obtaining from the third message an indication of a positioning mode selected by the removable module based on the available ones of the supported positioning modes of the terminal;
means for obtaining the location information in accordance with the selected positioning mode; and
means for sending a fourth message with the requested location information from the terminal to the removable module, the fourth message being sent by the terminal in response to the third message from the removable module.

20. The terminal of claim 19, further comprising:
means for determining a location estimate for the terminal in response to the third message, and wherein the location information comprises the location estimate.

21. A terminal for wireless communication, comprising:
at least one processor configured to:
send a first message with positioning capabilities of the terminal to a removable module removably mated to the terminal, wherein the positioning capabilities are indicative of one or more supported positioning modes of the terminal,
send a second message to the removable module prior to receiving a request for location information, the second message including an indication of available ones of the supported positioning modes of the terminal,
receive a third message sent by the removable module to the terminal, the third message comprising the request for location information,
obtain from the third message a positioning mode selected by the removable module based on the available ones of the supported positioning modes of the terminal,
obtain the location information in accordance with the selected positioning mode, and
send a fourth message with the requested location information from the terminal to the removable module, the fourth message being sent by the terminal in response to the third message from the removable module.

22. The terminal of claim 21, wherein the at least one processor is configured to determine a location estimate for the terminal in response to the third message, and wherein the location information comprises the location estimate.

23. A computer program product in a terminal for wireless communications, comprising:
a non-transitory computer-readable medium comprising:
code for causing at least one computer to send a first message to a removable module removably mated to the terminal, the first message including an indication of positioning capabilities of the terminal, wherein the positioning capabilities are indicative of one or more supported positioning modes of the terminal;
code for causing the at least one computer to send a second message to the removable module prior to receiving a request for location information, the second message including an indication of available ones of the supported positioning modes of the terminal;
code for causing the at least one computer to receive a third message sent by the removable module, the third message comprising the request for location information;
code for causing the at least one computer to obtain from the third message received from the removable module an indication of a positioning mode selected by the removable module based on the available ones of the supported positioning modes of the terminal;
code for causing the at least one computer to obtain the location information in accordance with the selected positioning mode; and
code for causing the at least one computer to send a fourth message with the requested location information from the terminal to the removable module, the fourth message being sent by the terminal in response to the third message from the removable module.

24. The method of claim 1 wherein receiving the second message comprises receiving the second message in response to a change in the available ones of the supported positioning modes of the terminal.

25. The method of claim 24 wherein the supported positioning modes of the terminal comprise a Global Positioning System (GPS) mode, and receiving the second message further comprises receiving the second message in response to changes in detectability of GPS signals at the terminal.

26. The method of claim 15 wherein sending the second message comprises sending the second message in response to a change in the available ones of the supported positioning modes of the terminal.

27. The method of claim 26 wherein the supported positioning modes of the terminal comprise a Global Positioning System (GPS) mode, and sending the second message further comprises detecting a change to a detectability of GPS signals and sending the second message in response to the change.

28. The method of claim 15 wherein sending the first message comprises sending the first message to the removable module in response to insertion of the removable module into the terminal.

29. The method of claim 1 wherein receiving the second message comprises:
   sending, prior to sending the request for location information, a request for positioning availability to the terminal; and
   receiving the second message from the terminal in response to the request for positioning availability.

30. The method of claim 15 wherein sending the second message comprises:
   receiving, prior to receiving the request for location information, a request for positioning availability from the removable module; and
   sending the second message in response to the request for positioning availability.

* * * * *